Sept. 18, 1928.
D. H. ROSENBERG
1,684,556
FRUIT BOX PAD AND LINING
Filed June 29, 1926
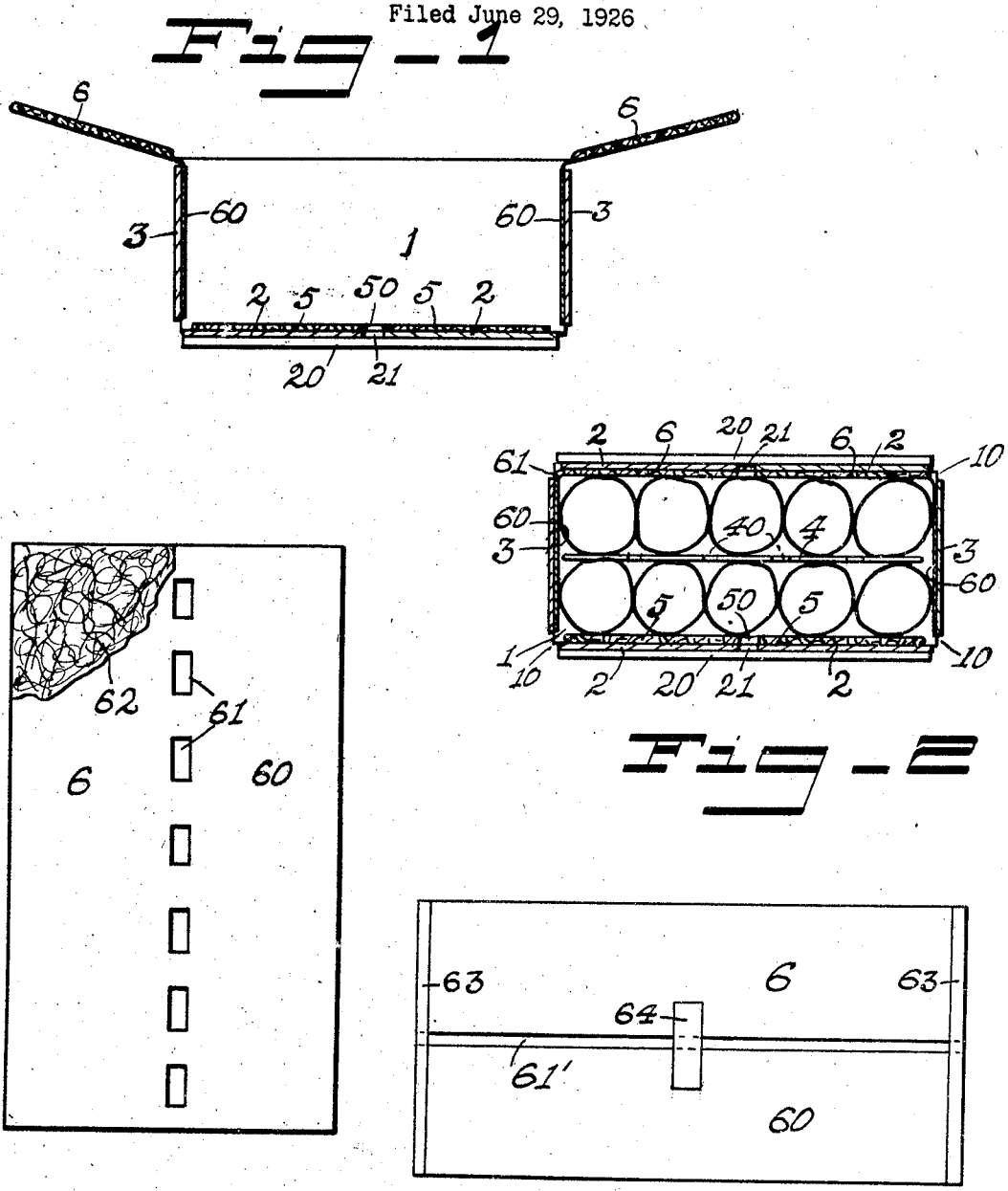
Inventor
David H. Rosenberg Patented Sept. 18, 1928.

1,684,556

UNITED STATES PATENT OFFICE.

DAVID H. ROSENBERG, OF MEDFORD, OREGON.

FRUIT-BOX PAD AND LINING.

Application filed June 29, 1926. Serial No. 119,315.

My invention relates to a fruit packing protector for the packing of fruit, and particularly to what is known as soft fruits, that is, fruits which are soft and easily damaged.

It consists of a pad and liner or mounting sheet of peculiar construction combined with the box and also of the method of packing the fruit by the use of such pads.

An object of my invention is the provision of a combined liner and pad, for a fruit box which will protect the fruit against bruising, which is simple and cheap in manufacture and convenient in use, and which will also present and attractive appearance when the box is opened.

A further object is to so coordinate the liner or pad with the type and construction of box used, that efficient ventilation is provided in the packed box.

Another object of my invention is, by increasing the ventilation within the fruit package, while using a cushion pad, to consequently shorten the time required for pre-cooling, and by better aeration or ventilation contributing to the keeping qualities while in storage.

Another object is to provide a combined pad and liner which may be more quickly and conveniently handled and therefore will reduce the time of packing of the fruit, and also of the lidding, thereby cutting the cost of packing and lidding.

Another object is to provide a combined liner and pad which need not be removed when the box is opened, as is the present practice, and when opened will present a more attractive display.

Other objects will be hereinafter set forth, while the novel features upon which I desire to secure a patent will be specifically set forth in the claims.

In the accompanying drawings I have shown my invention embodied in a form of construction which I now prefer to use with certain types of box of a standard construction. This will serve to make clear the principles upon which my invention is based.

Figure 1 is a transverse section of a box with liners and pads in place as assembled for packing.

Figure 2 is a transverse section of the same box after packing.

Figure 3 is a face view of the liner or pad used to cover one side and half of the top of the box.

Figure 4 is a face view of an equivalent pad and liner of slightly different construction.

Figure 5 is a detail showing in longitudinal section one end of the pad of the construction shown in Figure 4.

The particular type of box in which this has been chiefly used by me is the standard box of relatively shallow depth which, for certain sizes of fruit contains two layers. The particular fruit in the packing of which my invention has been chiefly used, is pears. It is, however, obvious that other sizes and types of box may have my invention applied thereto, and that the particular kind of fruit packed is immaterial. Its advantages are however, most apparent and beneficial when a soft fruit is being packed.

The type of box illustrated has end pieces or heads 1 of relatively thick stock, thin wood boards or strips 2 for both top and bottom, like thin boards 3 for the sides and cleats 20 placed outside of the top and bottom boards at each end. Such boxes are quite largely used for peaches and also for special high class or fancy pear trade. They are often referred to in the trade as "half boxes."

Generally two boards 2 are used for the top and for the bottom and one for each side 3. The width of these boards is quite generally such that the side boards 3 are of slightly less width than the heads 1, and the top boards 2 of slightly less than half the length of the heads 1. These boards 2 and 3 are so secured that there is usually a ventilation crack at each corner of the box, and another centrally of the width of both top and bottom, the latter crack being shown at 21.

My invention is, however, in no sense restricted in its application to this particular type of box, but is adapted to boxes which vary in construction from that specifically shown and described.

A method of packing which has heretofore been used is to place a pad upon the top of the box bottom, this pad being of a size at least equal to that of the bottom of the box, then place a liner at each side extending down to and overlapping the bottom, or a single liner which covers the bottom and both sides, such liners or liner in each case also covering the packed fruit at the top. Such liners close the cracks in the box and prevent free aeration, thus delaying pre-cooling and preventing free aeration, which contributes to the keeping qualities of the fruit in storage. After packing the lower layer, a spacer or pad, as 4 is placed over this layer, and then the top layer packed. The ends of the liner are folded over the fruit, a top pad placed over this and the cover then applied.

This method of procedure calls for both a liner and a pad. By my plan I combine the liner and the pad for the top, which makes less parts to place which saves both time of placing and material.

The top pad is made as two half-width sections 6. To the outer edge of each is secured a tail piece, skirt or narrow liner 60. Along the edge of the latter, which is connected with the pad section 6, are holes or perforations 61 which register with the upper corner cracks 10 to thereby provide ventilation. The top pads 6 do not quite meet at the center, thereby leaving open the center crack 21 for ventilation when such crack exists. Also the skirt or tail piece 60 is of enough less width than the depth of the box that its lower edge does not close the lower corner cracks 10. The central pad or separator 4 should preferably be slightly narrower than the box to provide ventilation openings at the sides of the box, and may also have perforations or holes as 40, in its fabric sheets, for ventilation purposes.

In Figures 4 and 5 I have illustrated a pad and liner which is the equivalent of that shown in Figure 3, but is of a type of construction somewhat cheaper. The pad section 6 and tail or skirt section 60 may be of any construction herein indicated. When the pad section 6 is of excelsior or other loose material covered with paper, its construction may be facilitated by using a strip 63 of paper having adhesive on one face, which strip is longitudinally folded, so as to embrace the end edges of the paper cover of the pad, which strip may also embrace the ends of the tail piece or skirt 60. If thought needful one or more pieces 64 of adhesive strip may be used to secure the parts 6 and 60 together. This plan obviates the expense of perforating the paper and provides ample ventilation openings at the corner of the box.

The bottom pad may be all in one piece, but the more desirable plan is to make the pad in two half-width sections 5, connected by a hinge section which is provided with holes or ventilating openings, such as holes 61 shown in Figure 3. These ventilating openings preferably, but not essentially, register with the crack 21 between the bottom boards 2. The over-all width of the bottom pad should be enough less than the width of the box so that its outer edges will not close the corner cracks 10.

The materials and methods employed in making the pads and liners is not material. A common type of pad employs excelsior 62 between two layers of paper. Corrugated paper would be well adapted for this purpose. For the skirt or tail section 60 thin paper might sometimes be employed. This may however, be made as a real pad, for instance, of corrugated paper.

With pads and liners of such construction used in a box such as illustrated, free circulation of air through the fruit is provided. This is particularly desirable when precooling. I have found from practical tests in commercial work, that a car of fruit so packed will cool down to the required temperature and condition, in several hours less time than when packed with pads and liners of equivalent construction, except that the ventilation means herein described are not incorporated therein.

The superior aeration and ventilation provided by my invention is of great advantage while the fruit is kept in storage, as it very materially increases its keeping range.

Should a box be employed of different proportions and type of construction, the construction or proportions of the pads may require variation. The central principle employed is the provision of ventilating means through or past the pads, this being when possible, at the points where ventilating openings are provided in the box.

With this is the further principle of combining the pad and curtain of the present practice in a pad and attached tail piece, whereby one article is substituted for two distinct articles, resulting in saving both of material and the time required in putting these parts in place.

What I claim as my invention is:

1. In combination with a fruit packing box, a fruit packing protector embodying a mounting sheet and a padded member secured by hinged means to said mounting sheet in spaced relation thereto, said spaced relation forming an aerating slot between said mounting sheet and padded member, said mounting member being held in position by the fruit pressing against the same.

2. In combination with a fruit packing box, a fruit packing protector embodying a mounting sheet and a padded member secured by hinged straps to said mounting sheet in spaced relation thereto, whereby a slot is provided in said protector which may be caused to substantially register with openings in the packing box.

3. In combination with a fruit packing box, a fruit protector embodying a mounting sheet of less area than the side of the box against which it is disposed and a padded member secured by hinged straps to said mounting sheet in spaced relation thereto thereby leaving a slot therebetween, said slot registering with the opening disposed along the upper edge of said box.

Signed at Seattle, King County, Washington, this 21 day of June, 1926.

DAVID H. ROSENBERG.